3,419,408
PHOTOGRAPHIC VIEWING SCREEN PREPARED FROM A LENTICULATED POLYESTER FILM
Larry Gerald Curtis and Parker J. Trent, Kingsport, Tenn., assignors to Eastman Kodak Company, Rochester, N.Y., a corporation of New Jersey
No Drawing. Filed Dec. 8, 1965, Ser. No. 512,554
6 Claims. (Cl. 117—10)

This invention relates to viewing screens for giving a three-dimensional effect to photographs, and more particularly, it relates to such screens being prepared from an embossable polyester film.

A three-dimensional effect can be obtained in photography by photographing a subject through a special screen which is designed to break the resulting image into a multiplicity of thin vertical strips. The developed and printed photograph can then be viewed through a suitable viewing screen which serves to focus the viewers eyes on alternating strips of the photograph and thereby creates an illusion of depth. The viewing screen is a lenticulated surface corresponding to the screen through which the photograph was taken. In the past, the screen has been made of glass or any of various thermoplastic resinous materials, and it has been made both in the form of a laminate and from an integral piece of material. The cost of manufacturing the screen from an integral piece of material or by a laminating technique has prevented widespread use of such viewing screens.

It is an object of this invention to provide a novel screen structure for three-dimensional viewing of stereophotographs. It is another object of this invention to provide a laminated viewing screen, which may be embossed to provide a lenticulated surface having excellent optical clarity and permanence. Still other objects will appear from the more detailed description which follows.

The foregoing objects are accomplished in accordance with this invention by providing a screen for three-dimensional viewing of photographs which comprises a transparent substrate coated with an embossed film of a polyester prepared from neopentyl glycol, isophthalic acid, and adipic acid in molar proportions of 1.0 glycol: 0.7–0.95 isophthalic acid: 0.05–0.3 adipic acid. In the preferred mode of embodiment of this invention, the screen is prepared from a glass substrate which is coated with an acrylic emulsion adhesive, and laminated to that adhesive is a polyester having molar proportions of 7 neopentyl glycol: 6 isophthalic acid: 1 adipic acid.

The prior art has employed as materials for making viewing screens resinous compositions such as polycarbonates, polystyrene, cellulose acetate, cellulose butyrate, methyl methacrylate, and polyvinyl chloride. All of these materials must be subjected to special processing steps in order to prepare the viewing screen. For example, compression molding may be required to prepare the final material, and this molding must be done under critical conditions which are difficult to reproduce economically because of the required tolerances, temperatures, pressures, and cycle times. Other processing techniques, e.g., the casting of methyl methacrylate and its bulk polymerization, are equally burdensome. In contrast to these materials and the requirements of their respective processing conditions the polyesters of this invention are easily embossed under mild conditions to produce lenticulated surfaces, and are capable of undergoing such embossing steps with fast cycle times.

The polyesters, which are employed in this invention, are generally of lower molecular weight than those which are employed in the manufacture of synthetic fibers and plastic films. The polyester, which is prepared from the three components; neopentyl glycol, isophthalic acid, and adipic acid, is apparently uniquely adapted for use as an important component of a viewing screen since modification of this polyester by the substitution or the addition of other materials changes it into a polyester which does not have the desired unique characteristics. The preferred polyester having the molar composition of 7 neopentyl glycol:6 isophthalic acid:1 adipic acid seems to have the optimum property combination of optical clarity, adhesiveness to the substrate, ability to be embossed with a sharp design, and ability to retain the embossing permanently. Although the proportions of ingredients may be changed somewhat without losing the majority of the good characteristics, the range through which the components may vary is rather narrow. Within the limits of molar proportions of about 1.0 neopentyl glycol:0.7–0.95 isophthalic acid:0.05–0.3 adipic acid viewing screens with good properties may be prepared. Outside of these ranges, the adhesiveness, optical clarity, or the ability to be embossed permanently begin to disappear too rapidly to result in an acceptable product.

It has been found that if the three components of the polyester are in the foregoing ranges, certain other materials may be added without adversely affecting the properties of the resin in any marked degree. For example, materials such as maleic anhydride or phthalic anhydride may be added in minor proportions, e.g., not more than about 0.1 mol per mol of neopentyl glycol, and the resulting product will lose very little of its excellent properties.

Many commercially available solid polyester resins are not suitable for use in this invention. For example a commercial solid polyester resin based on isophthalic acid was unsuited for this use, as well as a commercial solid polyester resin based on Bisphenol A. Some polyester resins, e.g., those made from ortho-phathalic anhydride are too soft for this application.

The substrate, which is employed in the process of this invention, is any transparent material, the most common of which is glass. Other transparent materials which are synthetic thermoplastic resinous substances include methyl methacrylate, cellulose acetate butyrate, polyethylene terephthalate, and many others known to those skilled in the art. This portion of the laminate is not a critical part of the invention and, therefore, any suitable substrate is intended to be included within the scope of this invention.

The laminated structure, which is employed as a viewing screen is prepared by heating the polyester above its melting point and applying it as a coating to the substrate. The means of applying the coating may be any of the methods well-known in the art of coating including such techniques as curtain coating, doctor blade coating, etc.

If desired, a primer may be employed on the substrate in order to enhance the bond between the polyester film and the substrate. This primer is applied to the substrate at any convenient time prior to the application of the polyester, and is accomplished by any of the normal techniques of brushing, spraying, pouring, etc. In a particularly desirable embodiment of this invention wherein glass is employed as a substrate, an acrylic emulsion adhesive ("Rhoplex" sold by Rohm & Haas Co.) has been found to be a most effective primer.

After the polyester film has been laminated to the substrate, the lenticulated surface is normally produced by an embossing technique. While the film is in a softened condition, the laminate is subjected to an embossing roll which produces the surface pattern in the film, and upon cooling the film retains that pattern permanently. This step of embossing is conveniently accomplished as soon as possible after the polyester film has been laminated to the substrate, or alternatively, the cooled laminate may be reheated to soften the polyester film just prior to the embossing operation.

The details of this invention may be more readily understood by reference to the following illustrative examples. These examples are intended to show certain embodiments of this invention and are not intended to restrict the invention in any manner whatsoever. Parts and percentages are by weight unless otherwise specified and temperatures are in degrees centigrade unless otherwise specified.

Example 1

A three-liter, four-neck, round-bottom flask was fitted with a stirrer, nitrogen inlet tube, thermometer, and packed, steam-jacketed condenser attached to two water-cooled condensers by a Barret water trap. To this apparatus, the following reactants were charged:

|  | Moles | Grams |
| --- | --- | --- |
| Neopentyl glycol | 7.35 | 764 |
| Isophthalic acid | 6.0 | 996 |
| Adipic acid | 1.0 | 146 |
| Dibutyltin oxide (catalyst) |  | 4 |

The above reactants were heated to 220° C. with agitation, over a 1.5-hour interval. By this time, 55 milliliters of water condensate had been collected as a by-product of the polyesterification reaction. The temperature of the reaction mixture was then gradually raised to 235° C. over an additional time interval of 2.5 hours, and held at this temperature for one additional hour. At this time, heat was removed and the reaction product was cooled slowly to room temperature. The acid number of the finished resin was found to be 9.9, and the number average molecular weight was 3,450.

Example 2

Approximately 50 grams of the polyester prepared in Example 1 was heated above its oftening point to about 250° F. The hot-melt was then applied as a 10-mil film to each of two glass plates. The first plate was uncoated glass, the second plate was identical to the first, except that it had been previously coated with an acrylic emulsion (Rohm & Haas "Rhoplex" B–15). After cooling, the coatings on both plates were compared. The coating on the second plate was definitely superior with respect to adhesion and impact resistance to the coating on the first plate, but the two coatings were considered essentially equal in terms of clarity, hardness, and scuff resistance.

A blocking test was then carried out to determine the resistance of the superior coating to softening at elevated temperatures such as might be encountered during processing, handling, or illumination of three-dimensional viewing screens. A piece of woven cotton cloth was placed over the coating and beneath a one-pound cylindrical weight. The coating was then heated in an oven with the weighted fabric so applied for 30 minutes at 150° F. At the end of this test, there had been no softening of the film and no perceptible adhesion of the cotton to the resinous coating.

Example 3

A sample of the polyester prepared in Example 1 was then similarly applied to a 12 x 15 inch plate previously treated with "Rhoplex" B–15. While the coating was still plastic, a lenticular pattern was embossed into the surface by manually passing an embossing roll over the length of the coating. After cooling, the resulting viewing screen was thoroughly examined and appraised for adhesion, impact resistance, heat resistance, and optical properties. It was entirely satisfactory and superior in these respects to any other viewing screens previously examined.

As a further test, the lenticular viewing screen prepared above was placed over a suitable stereophotograph and registration was accomplished by aligning the respective lenticular patterns, which served to focus the viewer's eyes on the alternating strips in the picture. The excellent illusion of depth achieved was entirely satisfactory and was illustrative of the excellent dimensional stability, clarity, and other optical properties exhibited by the experimental viewing screen.

Example 4

The synthesis procedure in Example 1 was repeated, except that a five percent molar excess of neopentyl glycol was reacted directly with isophthalic acid as the sole organic dibasic acid. This reaction was carried to essentially the same degree of completion as in Example 1. This polyester was then tested according to the procedure given in Example 2. The polyester coatings, so obtained, were equivalent to those previously described in Example 2 except that they were less satisfactory in adhesion and impact resistance.

Example 5

The synthesis procedure of Example 1 was repeated, except that a five percent molar excess of neopentyl glycol was reacted with phthalic anhydride. This reaction was carried to essentially the same degree of completion as in Example 1. The polyester, thus prepared, was then tested according to the procedure given in Example 2. The polyester coatings obtained were equivalent to those previously described in Example 2, except that they were less satisfactory in respect to blocking temperature and adhesion.

Although the invention has been described in considerable detail with reference to certain preferred embodiments thereof, it will be understood that variations and modifications can be affected within the spirit and scope of the invention as described hereinabove and as defined in the appended claims.

What is claimed is:

1. A screen for three-dimensional viewing of photographs which comprises a transparent substrate coated with a suitable film having a lenticulated surface, said film consisting essentially of a polyester prepared from neopentyl glycol, isophthalic acid, and adipic acid in molar proportions of 1 glycol:0.7–0.95 isophthalic acid:0.05–0.3 adipic acid.

2. The screen of claim 1 wherein the transparent substrate is glass.

3. The screen of claim 1 wherein the transparent substrate is a synthetic thermoplastic resin.

4. The screen of claim 1 wherein the film is 5–35 mils in thickness and the lenticulated surface is prepared by embossing.

5. The screen of claim 1 wherein an acrylic emulsion adhesive is interposed between the substrate and the coating.

6. A screen for three-dimensional viewing of a stereophotograph which consists essentially of a glass substrate coated with an acrylic emulsion adhesive and a lenticulated film adhered to said adhesive, said film comprising a polyester having residues of neopentyl glycol, isophthalic acid, and adipic acid in approximate molar proportions of 7:6:1 respectively.

References Cited

UNITED STATES PATENTS

| 3,153,005 | 10/1964 | Minter | 260—75 X |
| 3,241,429 | 3/1966 | Rice et al. | 117—10 X |
| 3,250,173 | 5/1966 | Henry | 161—2 X |
| 3,310,512 | 3/1967 | Curtice. | |

ALFRED L. LEAVITT, *Primary Examiner.*

R. L. BROWDY, *Assistant Examiner.*

U.S. Cl. X.R.

117—161; 260—75